(12) United States Patent
Kawai et al.

(10) Patent No.: US 6,701,292 B1
(45) Date of Patent: Mar. 2, 2004

(54) SPEECH RECOGNIZING APPARATUS

(75) Inventors: Chiharu Kawai, Kawasaki (JP);
Hiroshi Katayama, Kawasaki (JP);
Takehiro Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 09/699,777

(22) Filed: Oct. 30, 2000

(30) Foreign Application Priority Data

Jan. 11, 2000 (JP) .................................... 2000-002096

(51) Int. Cl.⁷ .............................................. G10L 15/10
(52) U.S. Cl. ..................................... 704/238; 704/239
(58) Field of Search .............................. 704/238, 239

(56) References Cited

U.S. PATENT DOCUMENTS 4,897,878 A * 1/1990 Boll et al. ................... 704/233
5,432,886 A * 7/1995 Tsukada et al. ............. 704/239

FOREIGN PATENT DOCUMENTS

| JP | 56-14381 | 2/1981 |
|---|---|---|
| JP | 63-38995 | 2/1988 |
| JP | 63-254498 | 10/1988 |
| JP | 5-210396 | 8/1993 |
| JP | 8-63183 | 3/1996 |

* cited by examiner

*Primary Examiner*—Susan McFadden
(74) *Attorney, Agent, or Firm*—Katten Muchin Zavis Rosenman

(57) ABSTRACT

A speech-recognizing apparatus for recognizing input speech comprises, an analysis unit for computing a characteristic vector for each of frames of the input speech, a correction-value storage unit for storing a correction distance in advance, a vector-to-vector-distance-computing unit for computing a vector-to-vector distance between the characteristic vector and the phoneme characteristic vector, an average-value-computing unit for computing an average value of vector-to-vector distances for one of the frames, a correction unit for computing a corrected vector-to-vector distance as a value of an expression of (the vector-to-vector distance-the average value+the correction distance), and a recognition unit for cumulating corrected vector-to-vector distances into a cumulative vector-to-vector distance and comparing the cumulative vector-to-vector distance with the word standard pattern in order to recognize the input speech.

5 Claims, 15 Drawing Sheets

Word standard patterns of the word "KAWAI".

FIG. 13
Reversed-time-lapse direction
Input voice

FIG. 14
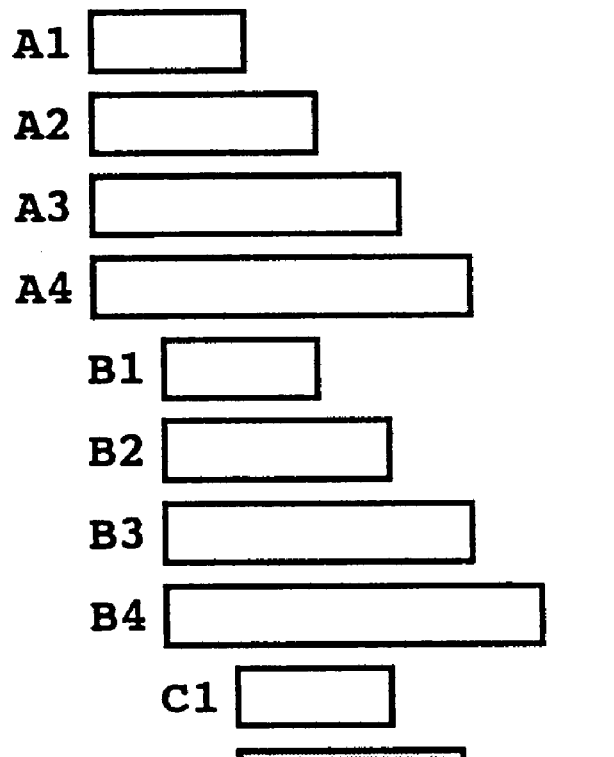
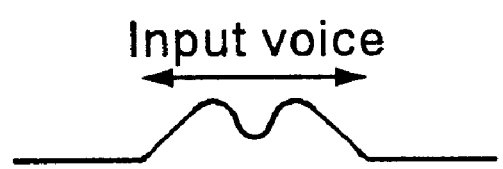
Input voice

FIG. 15
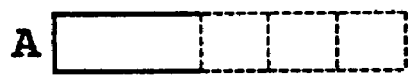
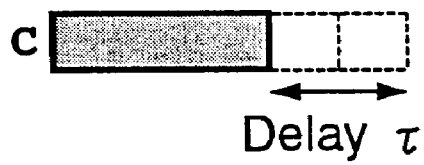
Delay $\tau$
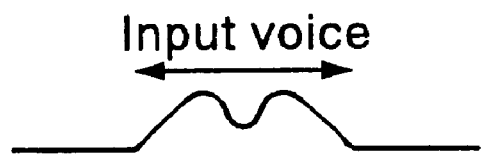
Input voice

SPEECH RECOGNIZING APPARATUS

BACKGROUND OF THE INVENTION

1. Field of the Invention

The present invention relates to a speech-recognizing apparatus. More particularly, the present invention relates to improvement of a speech-recognition rate in a noisy environment and reduction of the amount of speech-recognition processing.

2. Description of the Related Art

In recent years, presentation of products each including a speech-recognizing function has been becoming popular. However, speech-recognition technologies of the present state of the art have a problem of an inability to display good performance without restrictive conditions such as a requirement that the technologies be applied in a quiet environment. Such restrictions serve as a big barrier to popularization of the speech recognition, raising a demand for improvement of a speech-recognition rate in a noisy environment. One of conventional speech-recognition methods for improvement of a voice-recognition rate in a noisy environment is disclosed in Japanese Patent Laid-open No. Hei5-210396. This disclosed method is referred to hereafter as a method of the first prior art. The first prior art provides a method for correcting a similarity between vectors by using a maximum similarity in the frame of the vectors. To put in detail, in accordance with this method, characteristics of an input audio signal are first analyzed and converted into a sequence of characteristic vectors along the time axis. A similarity between vectors is then found from a distance between a characteristic vector of 1 frame of the time-axis sequence of characteristic vectors and a characteristic vector composing a standard pattern cataloged in advance in accordance with a probability distribution. Then, a maximum value of similarities between vectors is found for each frame.

Subsequently, a correction value is found from the maximum value of similarities between vectors found for each frame. A similarity between vectors is then corrected by using the correction value to produce a corrected similarity. Frame-corrected similarities are then cumulated to result in a cumulative corrected similarity. Subsequently, the cumulative corrected similarity is compared with a predetermined threshold value. If the cumulative corrected similarity is found greater than the threshold value, a voice corresponding to the cumulative corrected similarity is determined to have been input. Since a similarity between vectors is corrected by using a maximum similarity for each frame as described above, effects of noises kill each other, resulting in an improved speech-recognition rate. One of the conventional speech recognition methods for improving the speech-recognition rate in a word-spotting process is disclosed in Japanese Patent Laid-open No. Sho63-254498. This disclosed method is referred to hereafter as a method of the second prior art. This method utilizes a difference between largest and second largest similarities or a ratio of the largest similarity to the second largest similarity. To put it in detail, first of all, a characteristic parameter is extracted from an input voice. Then, a similarity between the extracted characteristic parameter and a characteristic parameter of a standard pattern is found. A cumulative similarity for each standard pattern cumulating similarities is then computed. A cumulative similarity is found by word spotting, which shifts the start point of time and the end point of time of a cumulating interval little by little. Subsequently, the cumulative similarities are sorted to determine the largest and second largest ones. Then, a difference between the largest and second largest similarities or a ratio of the largest similarity to the second largest similarity is compared with a predetermined threshold value. If the difference between the largest and second largest similarities or the ratio of the largest similarity to the second largest similarity is found greater than the threshold value, the input speech is determined to be a word corresponding to the largest cumulative similarity. By comparing a difference between the largest and second largest similarities or a ratio of the largest similarity to the second largest similarity with a predetermined threshold value as described above, only a probable result of recognition is recognized as a word. As a result, the speech-recognition rate is improved.

In the first prior art, a similarity between frames found by using a probability distribution is used in comparison of input speech with a standard pattern. In this case, the effect of the noise can be inferred to a certain degree by using a maximum similarity. If a distance between vectors is used in place of the similarity between frames, however, the minimum value of the vector-to-vector distances varies in dependence on, among others, the type of the phoneme. It is thus difficult to infer an effect of a noise by using the minimum value of the vector-to-vector distances. For this reason, there is raised a problem of impossibility to apply the method according to the first prior art to a case wherein a distance is used in comparison of an input voice with a standard pattern. In the case of the second prior art, on the other hand, the threshold value is set intensely so as to prevent a noise from being determined to be speech. In consequence, when the similarity between input speech and a standard pattern decreases due to the effect of a noise or the like, speech cannot be detected in many cases.

FIG. 14 is a diagram showing a problem of a word-spotting process. Notations A1, A2, A3, A4, B1, B2, B3, B4, C1, C2, C3 and C4 shown in FIG. 14 each denote a voice interval in a word-spotting process. It is quite within the bounds of probability that speech exists in each speech interval. The speech intervals have different start and end edges. For each of the speech intervals, a cumulative similarity between frames and a cumulative distance between frames are found by adopting methods such as a DP (Dynamic Programming) matching technique or an HMM technique. In the example shown in FIG. 14, the similarity of the speech interval C2 coinciding with an input voice is a maximum. It is quite within the bounds of probability that speech exists in each speech interval and since cumulative processing is carried out for each of such intervals, the word-spotting process has a problem of a large amount of processing. In order to solve this problem, there has been proposed an end-edge-free method. However, the end-edge-free method has the following problem.

FIG. 15 is a diagram showing the problem of the end-edge-free method. In the case of the end-edge-free method shown in FIG. 15, cumulative processing is carried out by identifying a start edge for an interval beginning from the start edge, which is treated as a speech-interval. Since cumulative processing is carried out for speech intervals A, B and C in the case of the end-edge-free method shown in FIG. 15 instead of the voice intervals A1, A2, A3, A4, B1, B2, B3, B4, C1, C2, C3 and C4 shown in FIG. 14 in the word-spotting process, the amount of processing can be reduced. Since a period between the start edge and a speech-input point with a fixed duration in the speech interval is indefinite, however, the end-edge-free method has a problem of a resulting extension. In the case of the voice interval C, for example, a delay $\tau$ inevitably results.

SUMMARY OF THE INVENTION

It is thus an object of the present invention addressing the problems described above to provide a speech-recognizing apparatus capable of improving the speech-recognition rate by reducing the effect of a noise in a case of using a distance between frames in comparison of an input voice with a standard pattern.

It is another object of the present invention to provide a speech-recognizing apparatus capable of detecting speech even for a case in which a frame-to-frame distance between input speech and a standard pattern increases or a frame-to-frame similarity between input speech and a standard pattern decreases due to an effect of a noise or the like.

It is a further object of the present invention to provide a speech-recognizing apparatus capable of reducing the amount of processing in a word-spotting process and decreasing the magnitude of a delay in the end-edge-free method.

In accordance with an aspect of the present invention, there is provided a speech-recognizing apparatus for recognizing input speech, the apparatus comprising a phoneme-standard-characteristic-pattern storage unit for storing a phoneme characteristic vector of a plurality of phoneme standard patterns in advance, an analysis unit for computing a characteristic vector for each of frames of the input speech, a vector-to-vector-distance-computing unit for computing a vector-to-vector distance between the characteristic vector for each of the frames and the phoneme characteristic vector, an average-value-computing unit for computing an average value of vector-to-vector distances of phonemes for one of the frames, a correction unit for correcting the vector-to-vector distance by subtracting the average value from the vector-to-vector distance, a word-standard-pattern storage unit for storing a word standard pattern defining side information of the phoneme standard patterns, and a recognition unit for cumulating corrected vector-to-vector distances each produced by the correction unit into a cumulative vector-to-vector distance and comparing the cumulative vector-to-vector distance with the word standard pattern in order to recognize the input speech.

In accordance with another aspect of the present invention, there is provided a speech-recognizing apparatus for recognizing input speech, the apparatus comprising an analysis unit for computing characteristic vectors of intervals in the input speech, a word-standard-pattern storage unit for storing characteristic vectors of word standard patterns in advance, a similarity-computing unit for comparing the characteristic vectors of the intervals in the input speech with the characteristic vector of the word standard patterns in order to compute first similarities to the word standard patterns for a portion of the input speech in each of the intervals, a first judgment unit for forming a judgment as to whether or not a word of the word standard patterns corresponding to the first similarities is a word represented by the input speech by comparison of the first similarities or a result of computation based on the first similarities with a first threshold value, a candidate storage unit for storing second similarities or a result of computation based on the second similarities, a candidate-determining unit, which is used for storing the first similarities or a result of computation based on the first similarities as the second similarities or a result of computation based on the second similarities respectively into the candidate storage unit if an outcome of a judgment formed by the first judgment unit indicates that the word of the word standard patterns corresponding to the first similarities is not the word represented by the input speech as evidenced by the fact that the first similarities or a result of computation based on the first similarities are smaller than the first threshold value, the first similarities or a result of computation based on the first similarities are greater than a second threshold value smaller than the first threshold value, and the first similarities or a result of computation based on the first similarities are greater than the second similarities or a result of computation based on the second similarities respectively, and a second judgment unit, which is used for determining that the word of the word standard patterns corresponding to the second similarities is the word represented by the input speech on the basis of the second similarities or a result of computation based on the second similarities stored in the candidate storage unit in case an outcome of a judgment formed by the first judgment unit indicates that the word of the word standard patterns corresponding to the first similarities is not the word represented by the input speech within a predetermined period.

In accordance with a further aspect of the present invention, there is provided a speech-recognizing apparatus for recognizing input speech, the apparatus comprising a phoneme-standard-pattern storage unit for storing a phoneme characteristic vector of a plurality of phoneme patterns in advance, an analysis unit for computing a characteristic vector of each frame in the input speech, a distance storage unit for storing vector-to-vector distances to the phoneme standard patterns for each frame, a vector-to-vector-distance-computing unit for computing a vector-to-vector distance between the characteristic vector of the frame and the phoneme characteristic vector of the phoneme standard patterns and storing the vector-to-vector distance into the distance storage unit, a word-standard-pattern storage unit for storing a word standard pattern defining side information of the phoneme standard patterns for each word in advance, a cumulative-distance-computing unit for reading out the vector-to-vector distances in a backward direction, that is, a direction from a most recent vector-to-vector distance to a less recent vector-to-vector distance, from the distance storage unit and computing a cumulative distance in the backward direction for each word, and a judgment unit for forming a judgment as to whether or not a word corresponding to the cumulative distance computed by the cumulative-distance-computing unit is a word represented by the input voice on the basis of the cumulative distance.

The above and other objects, features and advantages of the present invention as well as the manner of realizing them will become more apparent, while the invention itself will be best understood from a careful study of the following description and appended claims with reference to the attached drawings, which show some preferred embodiments of the invention.

BRIEF DESCRIPTION OF THE DRAWINGS

FIG. 13 is an explanatory diagram used for describing the operation of a cumulative-distance-computing unit employed in the speech-recognizing apparatus shown in FIG. 10;

FIG. 14 is an explanatory diagram used for describing a problem of an ordinary word-spotting process; and FIG. 15 is an explanatory diagram used for describing a problem of an end-edge-free method.

DETAILED DESCRIPTION OF THE PREFERRED EMBODIMENTS

Figure 1:
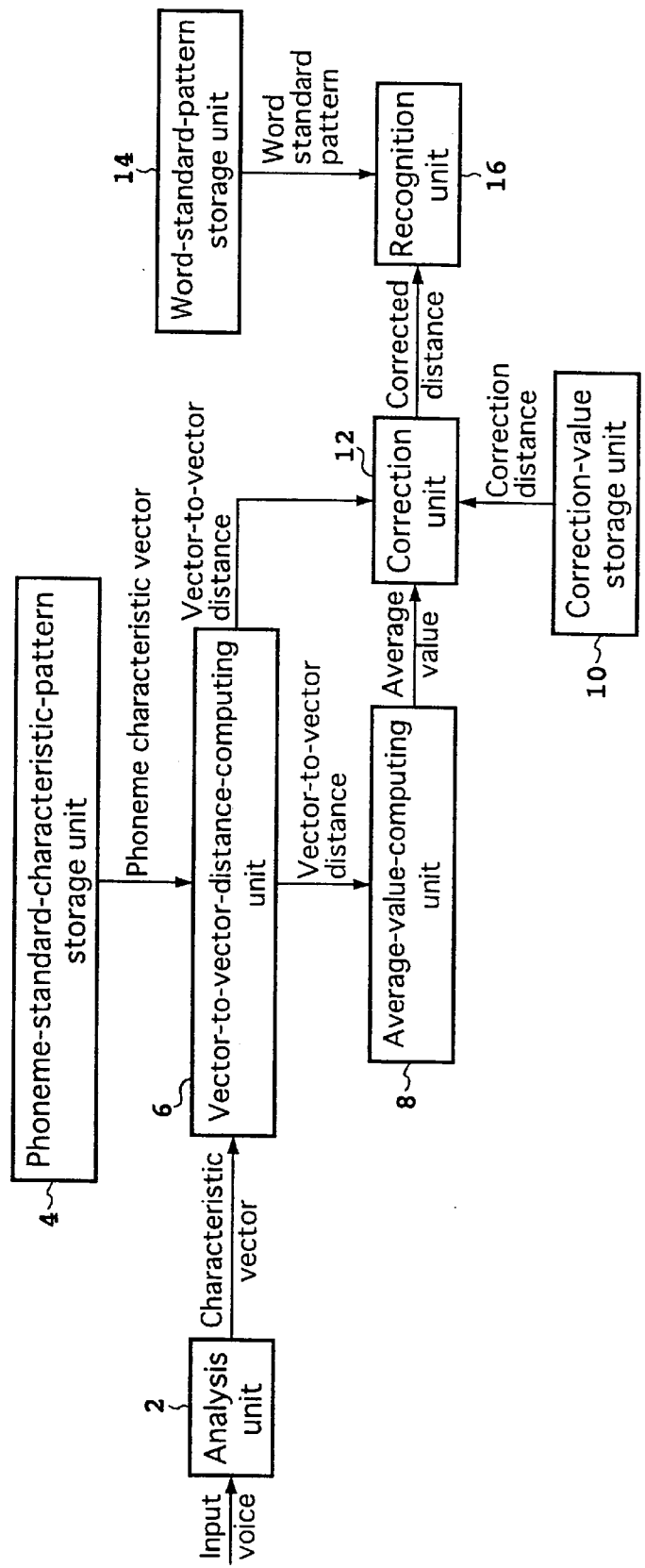
FIG. 1 is a diagram showing the principle of the present invention.

Before preferred embodiments implementing a speech-recognizing apparatus provided by the present invention are explained, the principle of the invention is described. FIG. 1 is a diagram showing the principle of the present invention. As shown in the figure, the speech-recognizing apparatus comprises an analysis unit 2, a phoneme-standard-characteristic-pattern storage unit 4, a vector-to-vector-distance-computing unit 6, an average-value-computing unit 8, a correction-value storage unit 10, a correction unit 12, a word-standard-pattern storage unit 14 and a recognition unit 16. Speech is entered in a state of no environmental noise. The analysis unit 2 computes a characteristic vector of each frame of the input speech and supplies the characteristic vector obtained as a result of computation to the vector-to-vector-distance-computing unit 6. The phoneme-standard-characteristic-pattern storage unit 4 is used for storing a phoneme characteristic vector of each phoneme. The vector-to-vector-distance-computing unit 6 computes a vector-to-vector distance between a computed characteristic vector received from the analysis unit 2 and a phoneme characteristic vector stored in the phoneme-standard-characteristic-pattern storage unit 4. The average-value-computing unit 8 computes an average value of the computed vector-to-vector distances of phonemes for each frame. The average value is a sum of an average value for an input speech entered in a state of no environmental noises and an average value caused by environmental noises. Typically, an average value of vector-to-vector distances for a state of no environmental noises is stored in the correction-value storage unit 10 as a correction distance. The correction unit 12 computes a vector-to-vector distance for each phoneme from the following expression:

(vector-to-vector distance of the phoneme)—(average value computed by the average-value-computing unit 8+correction distance)

A difference obtained as a result of subtracting the correction distance from an average value computed by the average-value-computing unit 8 is an inferred value of the average caused by environmental noises. Thus, the value of the expression (vector-to-vector distance of the phoneme)—(average value computed by the average-value-computing unit 8+correction distance) is a vector-to-vector distance excluding effects of the noises to a certain degree. The recognition unit 16 cumulates vector-to-vector distances corrected by the correction unit 12 to produce a cumulative distance and compares the cumulative distance with the word standard patterns stored in the word-standard-pattern storage unit 14 in order to recognize the voice. Since the vector-to-vector distance corrected by the correction unit 12 excludes effects of noises to a certain degree, the voice-recognition rate is improved.

First Embodiment

Figure 2:
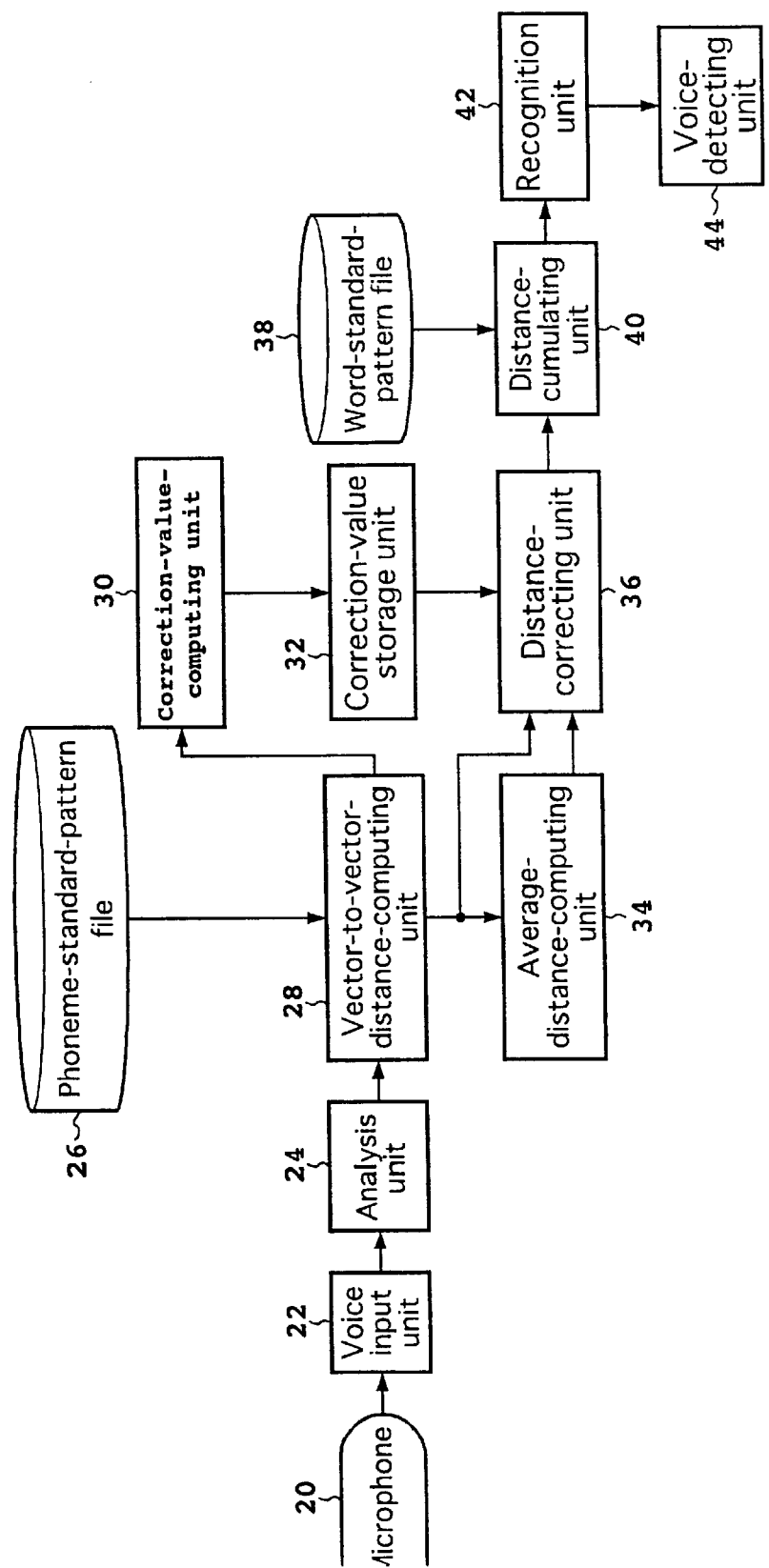
FIG. 2 is a diagram showing the configuration of a speech-recognizing apparatus implemented by a first embodiment of the present invention.

FIG. 2 is a diagram showing the configuration of a speech-recognizing apparatus implemented by a first embodiment of the present invention. As shown in FIG. 2, the speech-recognizing apparatus comprises a microphone 20, a voice input unit 22, an analysis unit 24, a phoneme-standard-pattern file 26, a vector-to-vector-distance-computing unit 28, a correction-value-computing unit 30, an average-distance-computing unit 34, a correction-value storage unit 32, a distance-correcting unit 36, a word-standard-pattern file 38, a distance-cumulating unit 40, a recognition unit 42 and a voice-detecting unit 44. The microphone 20 is an input unit for inputting a voice. The speech input unit 22 amplifies an analog audio signal received from the microphone 20 and converts the amplified analog audio signal into a digital signal. The analysis unit 24 carries out signal processing such as a cepstrum analysis on the input audio signal for each speech frame with a fixed typical time duration in the range 10 to 20 ms in order to produce a multi-dimensional characteristic vector having a predetermined number of dimensions such as 34 dimensions. The phoneme-standard-pattern file 26 is a file used for storing phoneme characteristic vectors obtained as a result of signal processing similar to that of the analysis unit 24 for phonemes such as vowels as phoneme standard patterns in advance. The vector-to-vector-distance-computing unit 28 computes a Euclid distance between the characteristic vector of a speech frame computed by the analysis unit 24 and a phoneme standard pattern.

Figure 3:
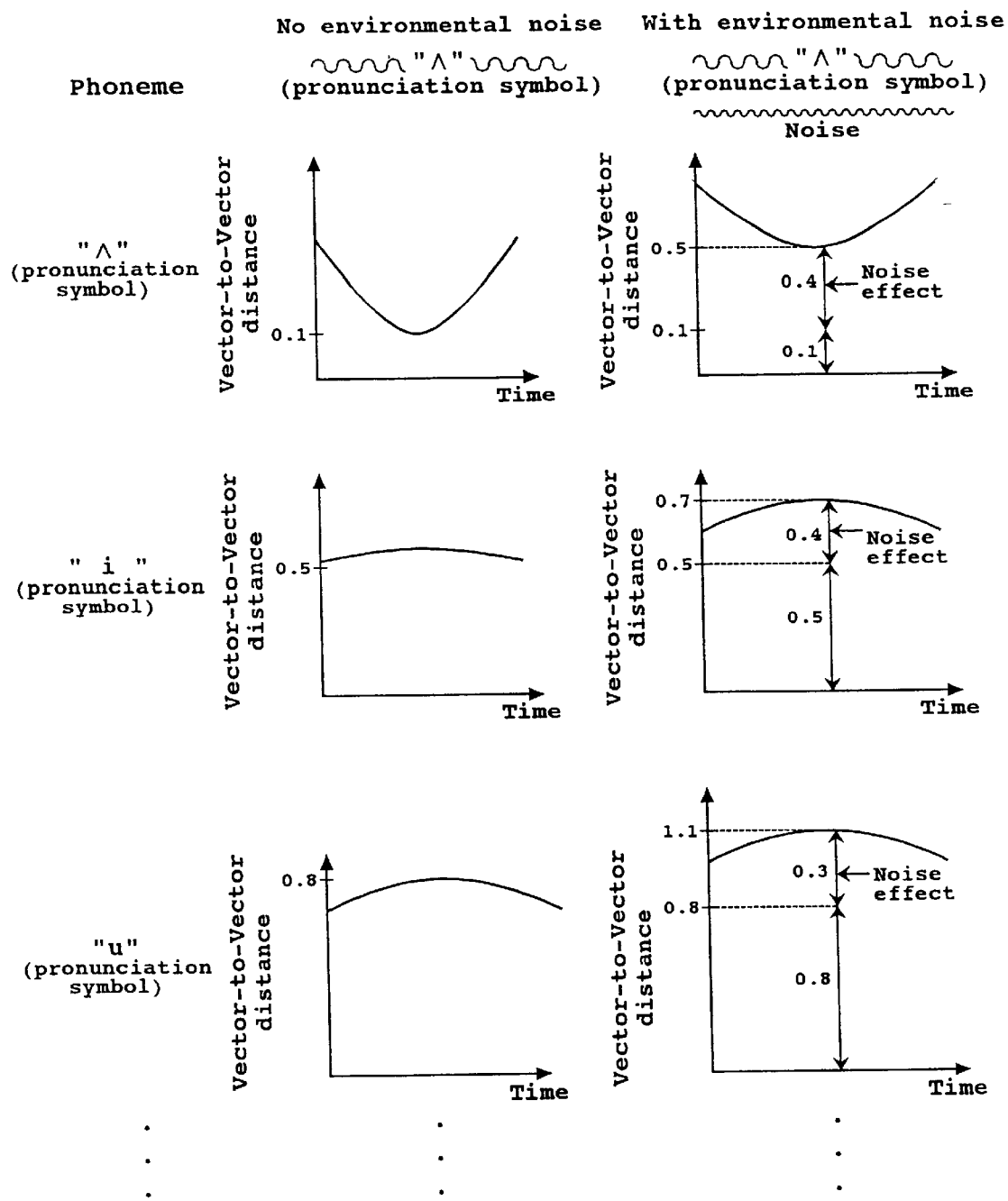
FIG. 3 is diagrams each showing effects of environmental noises.

FIG. 3 is diagrams each showing effects of environmental noises. Each diagram in this figure shows a relation between the vector-to-vector distance between input voice "Λ" (pronunciation symbol) and a phoneme standard pattern represented by the vertical axis and time represented by the horizontal axis for a case with no environmental noise on the left side and a case with an environmental noise on the right side. The upper diagrams show the relations for the phoneme standard pattern "Λ" (pronunciation symbol) and the middle diagrams show the relations for a phoneme standard pattern "i" (pronunciation symbol). The lower diagrams show the relations for a phoneme standard pattern "u" (pronunciation symbol). It should be noted that the vector-to-vector distance is a distance between the characteristic vector of the input speech and phoneme standard patterns, which are each calculated on the basis of speech entered in a state of no environmental noise. As shown in the diagram on the upper left side, the minimum value of the vector-to-vector distances between the input speech "Λ" and the phoneme standard pattern "Λ" is typically 0.1 where notation "Λ" is a pronunciation symbol. The minimum value is not 0 because the distance varies from human speaker to human speaker even for the same phoneme. Thus, the fact that the character vector of an input voice is not always the same as the phoneme standard pattern is taken into consideration. For a phoneme standard pattern "Λ" at the minimum vector-to-vector distance from the input voice "Λ", the vector-to-vector distance between the characteristic vector of the input voice "Λ" and the phoneme standard pattern "i" (pronunciation symbol) is 0.5 as shown in the diagram on middle left side whereas the vector-to-vector distance between the characteristic vector of the input voice "Λ" and the phoneme standard pattern "u" (pronunciation symbol) is 0.8 as shown in the diagram on lower left side.

With an environmental noise existing, on the other hand, the minimum value of the vector-to-vector distances between the input speech "Λ" and the phoneme standard pattern "Λ" is typically 0.5 as shown in the diagram on upper right side. Since the minimum value of the vector-to-vector distances with no environmental noise existing is 0.1 as described above, the effect of the noise is the difference of 0.4. For a phoneme standard pattern "Λ" at the minimum vector-to-vector distance from the input speech "Λ", the vector-to-vector distance between the characteristic vector of the input voice "Λ" and the phoneme standard pattern "i" (pronunciation symbol) is 0.7 as shown in the diagram on middle right side whereas the vector-to-vector distance between the characteristic vector of the input speech "Λ" and the phoneme standard pattern "u" (pronunciation symbol) is 1.1 as shown in the diagram on lower right side. Thus, the effect of the noise is the difference of 0.2 for the phoneme standard pattern "i" and 0.3 for and the phoneme standard pattern "u".

As described above, for the same input speech, the effect of the noise varies in accordance with the phoneme standard pattern as is obvious from comparison of a diagram on the upper right side with a diagram on the middle right or lower right for the same input speech. An average value of the effects of the noise on the vector-to-vector distance between the characteristic vector of an input voice and the phoneme standard pattern computed for all phoneme standard patterns is inferred to be a fixed value which does not depend on the input speech. The average value of the effects of the noise is inferred to be the value of the following expression:

(average value of vector-to-vector distances between the characteristic vector of input speech and the phoneme standard patterns)—(average value of vector-to-vector distances between the characteristic vector of input speech entered in a state of no environmental noise and the phoneme standard patterns (correction distance))

The subtrahend in the above expression is referred to as a correction distance.

The correction-value-computing unit 30 computes the subtrahend in the above expression or the correction distance in advance for later use in the calculation of the effect of the noise on input speech entered in a state of an environmental noise, and stores the correction distance in the correction-value storage unit 32. The correction-value storage unit 32 is a memory for storing the correction distance. As described above, the vector-to-vector-distance-computing unit 28 computes vector-to-vector distances between input speech frames and the phoneme standard patterns. The average-distance-computing unit 34 computes an average value of the vector-to-vector distances computed by the vector-to-vector-distance-computing unit 28 for all the phoneme standard patterns and outputs the average value to the distance-correcting unit 36. The distance-correcting unit 36 computes the value of the following expression as a corrected vector-to-vector distance supplied to the distance-cumulating unit 40.

(vector-to-vector distances between input speech frames and the phoneme standard patterns)—(average value+correction distance)

where the vector-to-vector distances between input speech frames and the phoneme standard patterns are computed by the vector-to-vector-distance-computing unit 28, the average value is computed by the average-distance-computing unit 34 and the correction distance is stored in the correction-value storage unit 32. The word-standard-pattern file 38 is a file for storing side information of phonemes composing each word. The distance-cumulating unit 40 sets a word interval between a start point and an end point of input speech by adoption of typically the word spotting technique, and cumulatively sums the corrected vector-to-vector distances computed by the distance-correcting unit 36 and included in the word interval by adoption of the DP matching technique or the HMM technique in accordance with the side information of phonemes composing each word stored in the word-standard-pattern file 38 to produce a cumulative distance of the word standard patterns. The recognition unit 42 compares the cumulative distance of the word standard patterns with a predetermined threshold value. If the cumulative distance of the word standard patterns is found smaller than the threshold value, the input speech is determined to be a speech matching a word corresponding to the word standard patterns. The speech-detecting unit 44 supplies the word recognized by the recognition unit 42 to an output unit such as a speaker, which is not shown in the figure.

The operation of the speech-recognizing apparatus shown in FIG. 2 is explained as follows.

a: Computation of the Correction Distance

Figure 4:
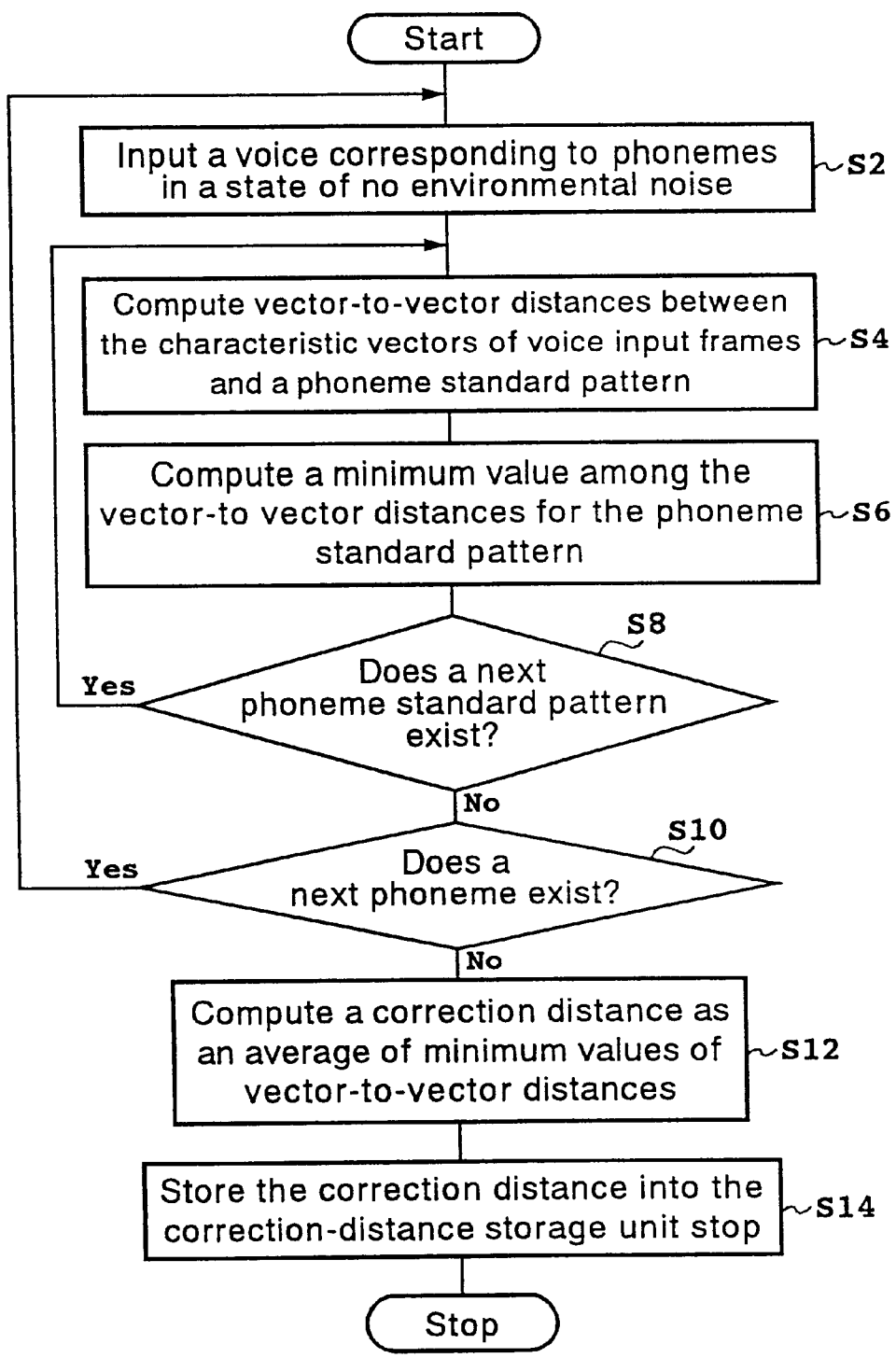
FIG. 4 shows a flowchart representing processing carried out by a correction-value-computing unit.

FIG. 4 shows a flowchart representing processing carried out by a correction-value-computing unit 30 employed in the speech-recognizing apparatus shown in FIG. 2. As shown in the figure, the flowchart begins with a step S2 at which speech corresponding to phonemes is input from the microphone 20 in a state of no environmental noise. The speech input unit 22 converts the input analog signal representing the speech into a digital signal. The analysis unit 24 then carries out signal processing such as the cepstrum analysis on the input audio signal in order to produce a characteristic vector. At the next step S4, the vector-to-vector-distance-computing unit 28 computes vector-to-vector distances between characteristic vectors of frames of the input speech and a phoneme standard pattern stored in the phoneme-standard-pattern file 26. At the next step S6, the correction-value-computing unit 30 finds a minimum value among the vector-to-vector distances for the phoneme standard pattern and identifies a frame for the minimum vector-to-vector distance. At the next step S8, the correction-value-computing unit 30 forms a judgment as to whether or not a next phoneme standard pattern exists. If a next phoneme standard pattern exists, the flow of the processing goes back to the step S4. If a next phoneme standard pattern does not exist, on the other hand, the flow of the processing goes on to the step S10. At the next step S10, the correction-value-computing unit 30 forms a judgment as to whether or not a next phoneme exists. If a next phoneme exists, the flow of the processing goes back to the step. S2. If a next phoneme does not exist, on the other hand, the flow of the processing goes on to the step S12. At the step S12, the correction-value-computing unit 30 gathers all the minimum values found at the step S6 for all phoneme standard patterns detected at the step S8 and for all input speech corresponding to phonemes detected at the step S10. The correction-value-computing unit 30 then computes a correction distance as an average of all these minimum values. At the next step S14, the correction-value-computing unit 30 stores the correction distance in the correction-value storage unit 32.

b: Speech Recognition

Assume for example that a voice "KAWAI" is entered via the microphone 20 in a state of an existing environmental noise such as a mechanical sound of an air conditioner and other speech of human beings. The microphone 20 converts the input speech into an electrical signal. The speech input unit 22 amplifies the electrical signal received from the microphone 20 and converts the amplified analog electrical signal into a digital signal. The analysis unit 24 carries out signal processing such as a cepstrum analysis on the input audio signal for each speech frame with a fixed typical time duration in the range 10 to 20 ms in order to produce a multi-dimensional characteristic vector having a predetermined number of dimensions such as 34 dimensions.

Figure 5:
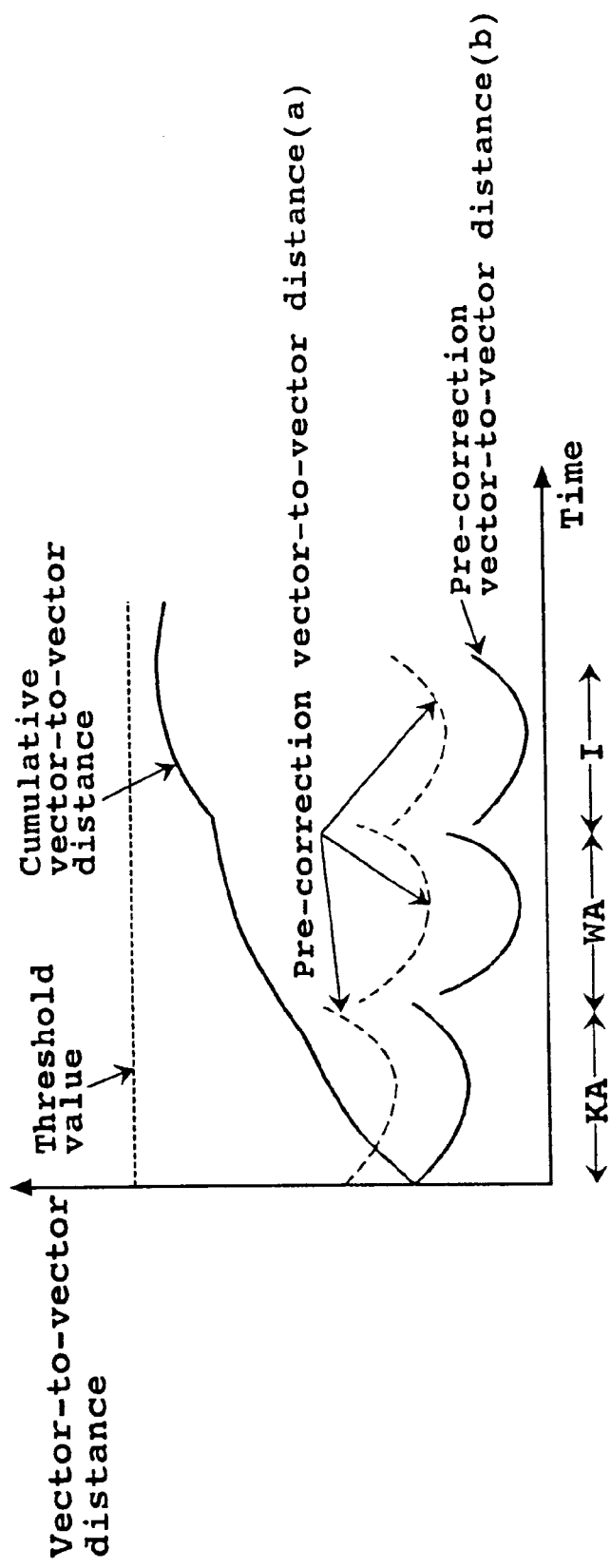
FIG. 5 is a diagram showing results of processing output by a vector-to-vector-distance-computing unit, a distance-correcting unit and a distance-cumulating unit, which are employed in the speech-recognizing apparatus shown in FIG. 2.

FIG. 5 is a diagram showing results of processing output by the vector-to-vector-distance-computing unit 28, the distance-correcting unit 36 and the average-distance-computing unit 34, which are employed in the speech-recognizing apparatus shown in FIG. 2. The vector-to-vector-distance-computing unit 28 computes Euclid distances, that is, vector-to-vector distances between characteristic vectors of speech frames computed by the analysis unit 24 and phoneme standard patterns. In the case of the input speech of "KA", "WA" and "I", vector-to-vector distances (a) to phoneme standard patterns corresponding to "KA", "WA" and "I" are each represented by a dashed line in FIG. 5. The vector-to-vector distance to phoneme standard patterns each represented by a dashed line are affected by an environmental noise. The average-distance-computing unit 34 computes an average value of the vector-to-vector distances between input speech frames and phoneme standard patterns computed by the vector-to-vector-distance-computing unit 28 for all the phoneme standard patterns, and outputs the average value to the distance-correcting unit 36. The distance-correcting unit 36 computes the value of the following expression as a corrected vector-to-vector distance supplied to the distance-cumulating unit 40.

(vector-to-vector distances)—(average value)+ (correction distance)

where the vector-to-vector distances between input speech frames and the phoneme standard patterns are computed by the vector-to-vector-distance-computing unit 28, the average value is computed by the average-distance-computing unit 34 and the correction distance is stored in the correction-value storage unit 32.

Values of the above expression (vector-to-vector distances-average value+correction distance) for the phoneme standard patterns corresponding to "KA", "WA" and "I" are shown as post-correction vector-to-vector distances (b) in FIG. 5. The post-correction vector-to-vector distances (b) are vector-to-vector distances with no effect of an environmental noise for input speech entered in a state of such noise. In addition, input speech may be entered in a state of no environmental noise in some cases. In this case, the average vector-to-vector distance or the average value in the above expression is about equal to the correction distance. Thus, the value of the above expression or the post-correction vector-to-vector distance is about equal to the vector-to-vector distances in the above expression or the pre-correction vector-to-vector distance. As a result, in the case of input speech entered in a state of no environmental noise, the speech-recognition rate by no means decreases.

The distance-cumulating unit 40 sets a word interval between a start point and an end point of input speech by adoption of typically the word spotting technique, and cumulatively sums the corrected vector-to-vector distances computed by the distance-correcting unit 36 and included in the word interval by adoption of the DP matching technique or the HMM technique in accordance with the side information of phonemes composing each word stored in the word-standard-pattern file 38 to produce a cumulative distance for the word standard patterns. For example, the vector-to-vector distance for the word "KAWAI" is represented by a single solid-line curve in FIG. 5. The recognition unit 42 compares the cumulative distance of the word standard patterns with a predetermined threshold value. If the cumulative distance of the word standard patterns is found smaller than the threshold value, the input speech is determined to be a speech matching a word corresponding to the word standard patterns. If the input speech "KAWAI" is entered in a state of an environmental noise, for example, the cumulative distance is computed from the pre-correction vector-to-vector distances, which are increased by the environmental noise. Thus, the cumulative distance may exceed the threshold value in some degree. In this embodiment, however, the cumulative distance is computed from the post-correction vector-to-vector distances, from which the effect of the environmental noise has been eliminated to a certain degree. It is thus quite within the bounds of probability that the cumulative distance does not exceed the threshold value. As a result, the speech-recognition rate in a state of an environmental noise is increased. In addition, even in the case of input speech entered in a state of no environmental noise, the speech-recognition rate by no means decreases as described above.

The speech-detecting unit 44 supplies the word recognized by the recognition unit 42 to an output unit such as a speaker, which is not shown in the figure. In accordance with the first embodiment described above, even if a distance vector is used in the speech recognition process, the voice-recognition rate in a state of an environmental noise can be increased.

Second Embodiment

Figure 6:
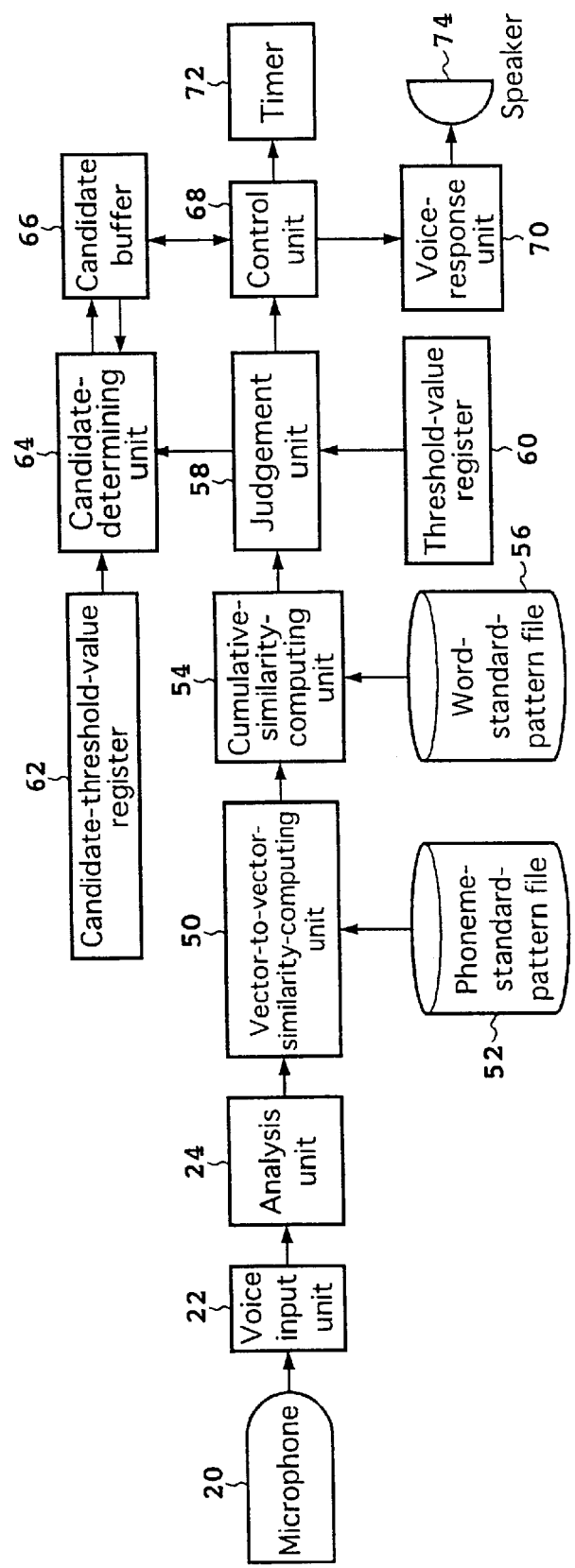
FIG. 6 is a diagram showing the configuration of a speech-recognizing apparatus implemented by a second embodiment of the present invention.

FIG. 6 is a diagram showing the configuration of a speech-recognizing apparatus implemented by a second embodiment of the present invention. Configuration elements of the second embodiment virtually identical with those of the first embodiment shown in FIG. 2 are each denoted by the same reference numeral as the counterpart in the latter. As shown in FIG. 6, the speech-recognizing apparatus comprises a microphone 20, a speech input unit 22, an analysis unit 24, a vector-to-vector-similarity-computing unit 50, a phoneme-standard-pattern file 52, a cumulative-similarity-computing unit 54, a word-standard-pattern file 56, a judgment unit 58, a threshold-value register 60, a candidate-threshold-value register 62, a candidate-determining unit 64, a candidate buffer 66, a control unit 68, a speech response unit 70, a timer 72 and a speaker 74.

The vector-to-vector-similarity-computing unit 50 applies a probability-density function defined for phoneme standard patterns cataloged in the phoneme-standard-pattern file 52 to the characteristic vector of a speech frame in order to compute a vector-to-vector similarity for each of the phoneme standard patterns. The vector-to-vector similarity is a quantity indicating how much a speech frame is similar to a phoneme standard pattern. Typically, the vector-to-vector similarity is a real number having a value in the range 0 to 1. The closer to 1 the value of the vector-to-vector similarity is, the more similar to a phoneme standard pattern the speech frame is. It should be noted that, while a vector-to-vector similarity is computed in this embodiment, a vector-to-vector distance may of course be calculated as is the case with the first embodiment.

The phoneme-standard-pattern file 52 is a file for storing a probability-density function in a characteristic-vector space of phoneme standard patterns in advance. The cumulative-similarity-computing unit 54 computes a cumulative similarity from information on phonemes composing a word by referring to word standard patterns cataloged in the word-standard-pattern file 56. The word-standard-pattern file 56 is a file for storing side information of phonemes of word standard patterns in advance. The judgment unit 58 compares a first threshold value stored in the threshold-value register 60 in advance with $\alpha$, where $\alpha$ is a first cumulative similarity of a word standard pattern, or a result of computation based on the first cumulative similarity and a second cumulative similarity such as a difference between the first cumulative similarity and the second cumulative similarity or a ratio of the first cumulative similarity to the second cumulative similarity. If the first threshold value is found smaller than $\alpha$, the judgment unit 58 informs the control unit 68 that speech has been recognized and notifies the control unit 68 of the recognized word. If the first threshold value is found equal to or greater than $\alpha$, on the other hand, the judgment unit 58 outputs $\alpha$ to the candidate-determining unit 64. It should be noted that, in the case of a cumulative distance used in place of the cumulative similarity, the judgment unit 58 informs the control unit 68 that speech has been recognized and notifies the control unit 68 of the recognized word if a cumulative distance or a result of computation based on cumulative distances is smaller than a threshold value.

The candidate-threshold-value register 62 is a register for storing a candidate threshold value. A candidate threshold value is smaller than the first threshold value and must be set at a value that prevents the speech-recognition rate from decreasing even if the cumulative similarity decreases due to an effect of an environmental noise.

The candidate-determining unit 64 deletes $\beta$ from the candidate buffer 66 and stores a received from the judgment unit 58 into the candidate buffer 66 in place of $\beta$ provided that $\alpha$> the candidate threshold value and $\alpha>\beta$ where $\beta$ is the first cumulative similarity stored in the candidate buffer 66 or a result of computation based on the first cumulative similarity and a second cumulative similarity such as a difference between the first cumulative similarity and the second cumulative similarity or a ratio of the first cumulative similarity to the second cumulative similarity. In this way, even if the judgment unit 58 is not capable of recognizing speech representing a word due to an effect of an environmental noise, the voice representing the word with a first cumulative similarity exceeding a candidate threshold value is recognized to result in an increased speech-recognition rate.

The control unit 68 requests the speech response unit 70 to urge the user or the speaker to enter speech. The control unit 68 also activates the timer 72 and clears the candidate buffer 66 when a request for a speech input is made. In addition, the control unit 68 requests the speech response unit 70 to output a word, which has been recognized by the judgment unit 58, when the judgment unit 58 informs the control unit 68 of the speech recognition. Furthermore, the control unit 68 issues a request for an operation to output a word corresponding to a first cumulative similarity owning $\beta$ to the speech response unit 70 if $\beta$ is found stored in the candidate buffer 66 at the time the timer 72 times out.

The speech response unit 70 outputs a word indicated by the control unit 68 to the speaker 74. The timer 72 starts to function as a clock in accordance with a command issued by the control unit 68. The timer 72 times out when a fixed period of time lapses. Typically, the period of time is a duration of a word entered by the user.

Figure 7:
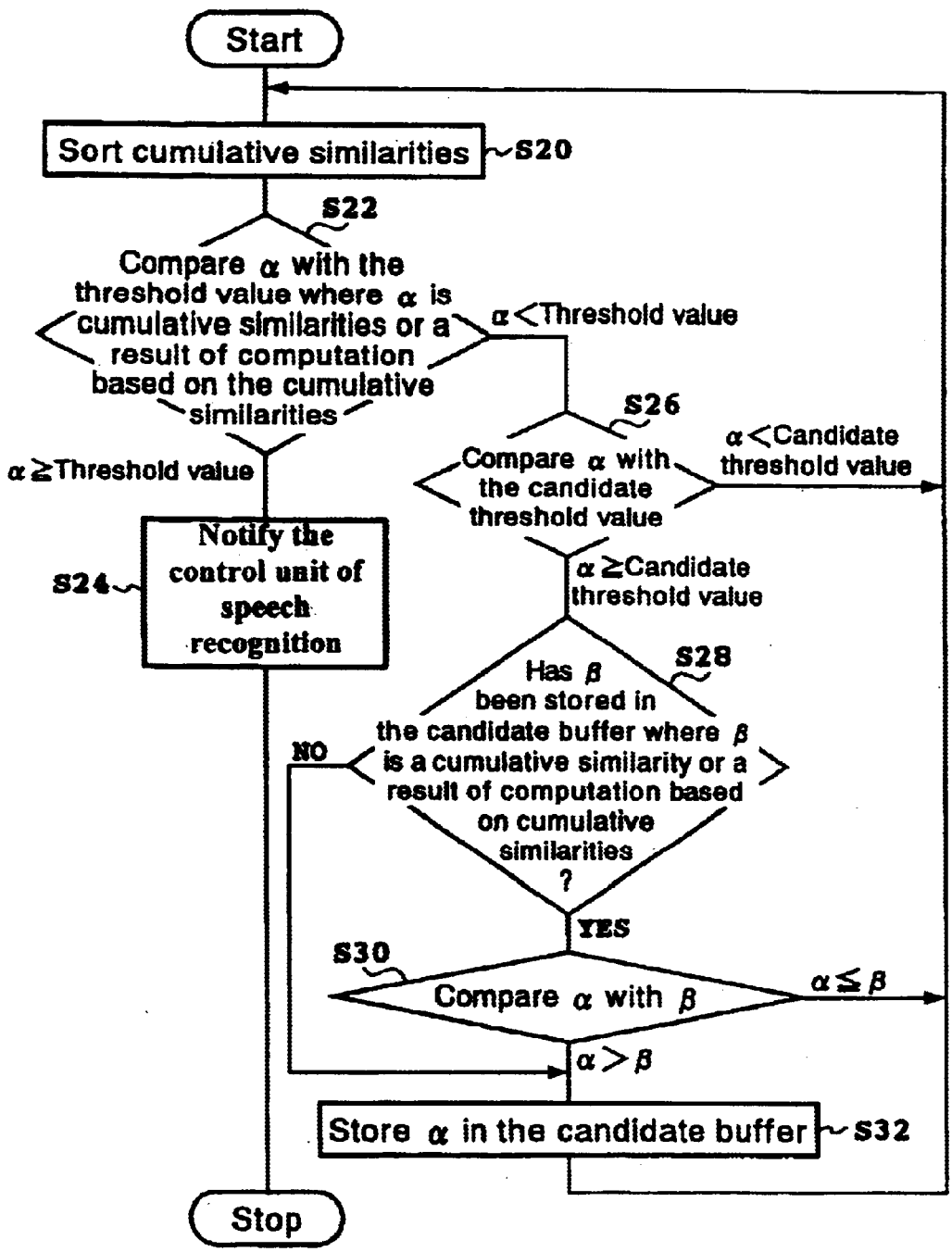
FIG. 7 shows a flowchart representing processing carried out by a judgment unit and a candidate-determining unit employed in the speech-recognizing apparatus shown in FIG. 6.
Figure 8:
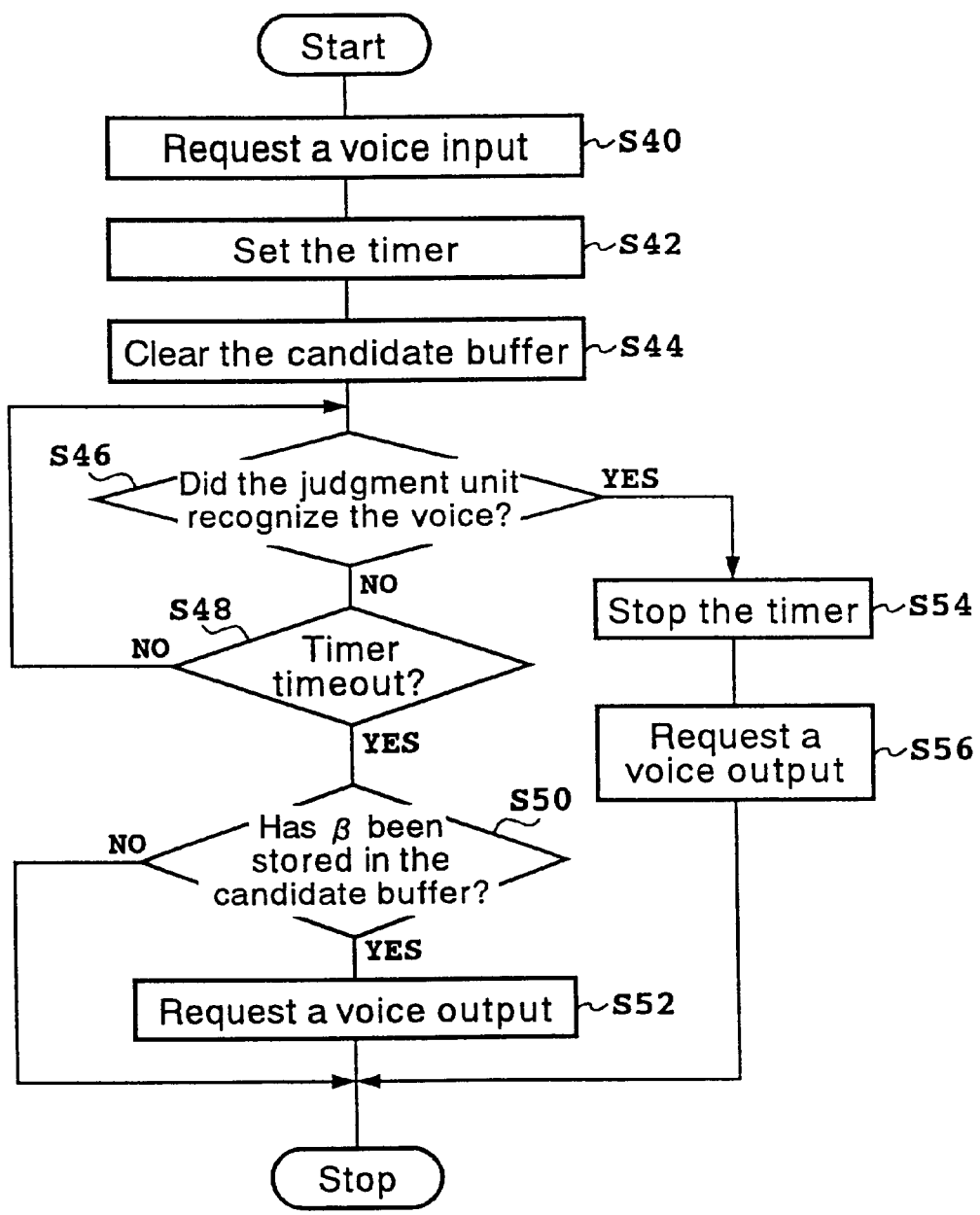
FIG. 8 shows a flowchart representing processing carried out by a control unit employed in the speech-recognizing apparatus shown in FIG. 6.

FIG. 7 shows a flowchart representing processing carried out by the judgment unit 58 and the candidate-determining unit 64 employed in the speech-recognizing apparatus shown in FIG. 6 whereas FIG. 8 shows a flowchart representing processing carried out by the control unit 68 employed in the speech-recognizing apparatus shown in FIG. 6. The operation of the speech-recognizing apparatus shown in FIG. 6 is explained by referring to these figures. This embodiment exemplifies an application of the present invention to a speech-recognizing apparatus employed in a vending machine or the like.

a: Speech Input

The flowchart shown in FIG. 8 begins with a step S40 at which the control unit 68 requests the speech response unit 70 to urge the user or the speaker to enter speech. In accordance with the request made by the control unit 68, the speech response unit 70 outputs a voice request for a speech input to the user through the speaker 74. The speech request typically says: "Say what you desire." At the next step S42, the control unit 68 sets the timer 72, and the timer 72 starts timing. At the next step S44, the control unit 68 clears the candidate buffer 66. For example, the user replies: "Coffee" through the microphone 20 in response to the speech request for a speech input made by the speech response unit 70. It is quite within the bounds of possibility that, at that time, the speech reply the by the user is mixed with an environmental noise generated in the environment in which the user is present. The microphone 20 converts the input speech into an electrical signal. The speech input unit 22 amplifies the analog electrical signal received from the microphone 20 and converts the amplified analog signal into a digital signal.

b: Speech Recognition

The analysis unit 24 carries out signal processing such as a cepstrum analysis on the input audio signal for each speech frame with a fixed typical time duration in the range 10 to 20 ms in order to produce a multi-dimensional characteristic vector having a predetermined number of dimensions such as 34 dimensions.

The vector-to-vector-similarity-computing unit 50 applies a probability-density function defined for phoneme standard patterns cataloged in the phoneme-standard-pattern file 52 to the characteristic vector of a speech frame in order to compute a vector-to-vector similarity for each of the phoneme standard patterns. The vector-to-vector similarity is a quantity indicating how much a speech frame is similar to a phoneme standard pattern. Typically, the vector-to-vector similarity is a real number having a value in the range of 0 to 1. The closer to 1 the value of the vector-to-vector similarity is, the more similar to a phoneme standard pattern the speech frame is. The cumulative-similarity-computing unit 54 computes a cumulative similarity from information on phonemes composing a word by referring to word standard patterns cataloged in the word-standard-pattern file 56. The flowchart shown in FIG. 7 begins with a step S20 at which the judgment unit 58 receives cumulative similarities from the cumulative-similarity-computing unit 54, and sorts the cumulative similarities in a decreasing order, that is, an order starting with the largest one and ending with the smallest one. The judgment unit 58 then determines first and second cumulative similarities from the decreasing-order list of cumulative similarities. At the next step S22, the judgment unit 58 compares a threshold value stored in the threshold-value register 60 in advance with α, where α is the first cumulative similarity, or a difference between the first cumulative similarity and the second cumulative similarity or a ratio of the first cumulative similarity to the second cumulative similarity. If α☐ the threshold value, the flow of the processing goes on to a step S24. If α< the threshold value, on the other hand, α is output to the candidate-determining unit 64. Then, the flow of the processing goes on to a step S26. At the step S24, the judgment unit 58 informs the control unit 68 that speech has been recognized and notifies the control unit 68 of the recognized word.

At the step S26, the candidate-determining unit 64 compares a candidate threshold value stored in the candidate-threshold-value register 62 with α. If α☐ the candidate threshold value, the flow of the processing goes on to a step S28. If α< the candidate threshold value, on the other hand, the flow of the processing goes back to the step S20. At the step S28, the candidate-determining unit 64 forms a judgment as to whether or not β has been stored in the candidate buffer 66 where β is the first cumulative similarity, a difference between the first cumulative similarity and the second cumulative similarity or a ratio of the first cumulative similarity to the second cumulative similarity. If β has been stored in the candidate buffer 66, the flow of the processing goes on to a step S30. If β has not been stored in the candidate buffer 66, on the other hand, the flow of the processing goes on to a step S32. At the step S30, the candidate-determining unit 64 compares α with β. If α>β, the flow of the processing goes on to a step S32. If α☐β, on the other hand, the flow of the processing goes back to the step S20. At the step S32, the candidate-determining unit 64 replaces β with α received from the judgment unit 58 and stores α in the candidate buffer 66. Then, the flow of the processing goes back to the step S20. In this way, with the lapse of time, β relevant to the first cumulative similarity is stored in the candidate buffer 66.

At a step S46 of flowchart shown in FIG. 8, the control unit 68 forms a judgment as to whether or not the judgment unit 58 was capable of recognizing the speech. If the judgment unit 58 was capable of recognizing the speech, the flow of the processing goes on to a step S54. If the judgment unit 58 was not capable of recognizing the speech, on the other hand, the flow of the processing goes on to a step S48. At the step S48, the control unit 68 forms a judgment as to whether or not the timer 72 has timed out. If the timer 72 has not timed out, the flow of the processing goes back to the step S46. If the timer 72 has timed out, on the other hand, the flow of the processing goes on to a step S50. At the step S50, the control unit 68 forms a judgment as to whether or not β has been stored in the candidate buffer 66. If β has been stored in the candidate buffer 66, the flow of the processing goes on to a step S52. If β has not been stored in the candidate buffer 66, on the other hand, the processing is ended by assuming that the speech could not be recognized. At the step S52, the control unit 68 issues a request for an operation to output a word corresponding to a first cumulative similarity associated with β stored in the candidate buffer 66 to the speech response unit 70. In accordance with the request made by the control unit 68, the speech response unit 70 outputs the word through the speaker 74. Thus, if the judgment unit 58 is not capable of recognizing speech during a fixed period of time, from a time to set the timer 72 to a timeout thereof due to an effect of an environmental noise, a word corresponding to a maximum cumulative similarity exceeding a candidate threshold is output through the speaker 74. If the outcome of the judgment formed at the step S46 indicates that the judgment unit 58 was capable of recognizing the speech, on the other hand, the flow of the processing goes on to a step S54 at which the control unit 68 stops the timer 72. At the next step S56, the control unit 68 requests the speech response unit 70 to output the word of the first cumulative similarity corresponding to α. In accordance with the request made by the control unit 68, the speech response unit 70 outputs the word through the speaker 74.

Figure 9:
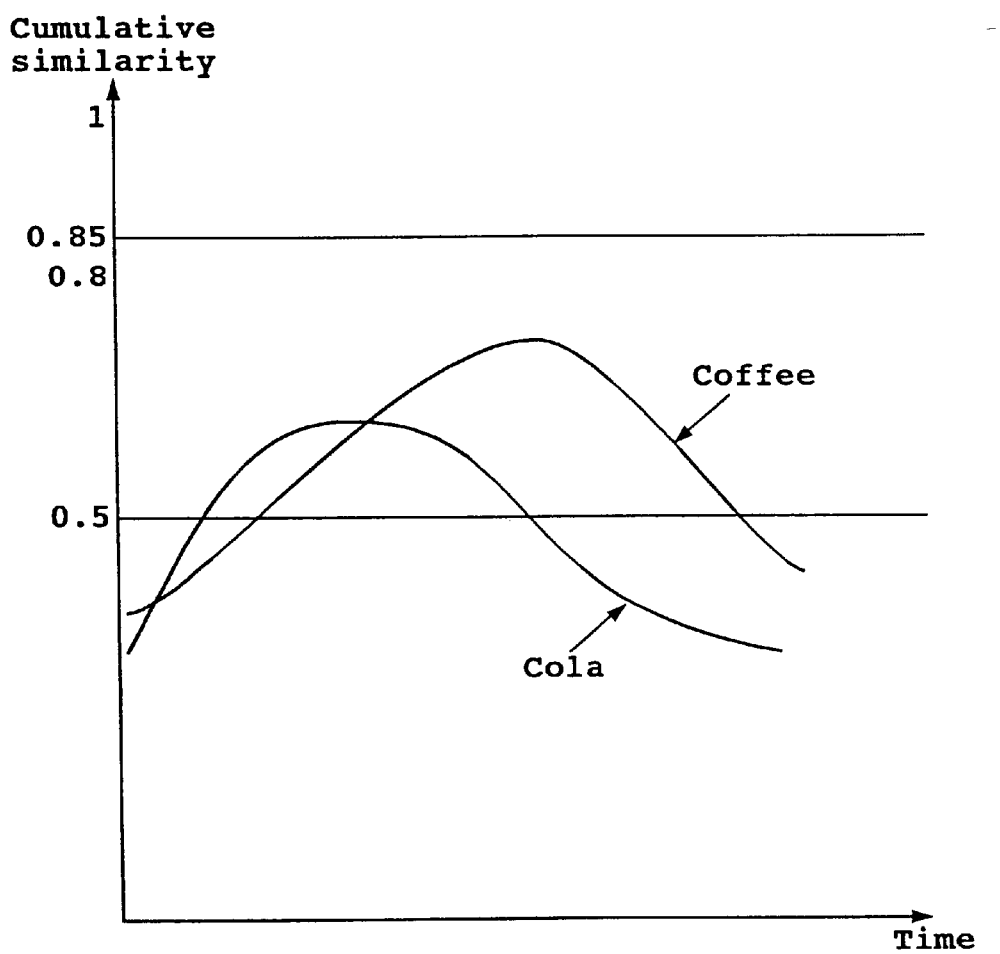
FIG. 9 is a diagram showing results of speech recognition produced by in the speech-recognizing apparatus shown in FIG. 6.

FIG. 9 is a diagram showing results of speech recognition produced in the speech recognizing apparatus wherein a cumulative similarity is compared with a threshold value for an input of "coffee" entered by the user in a state of an environmental noise. As shown in the figure, the input speech "coffee" has a cumulative similarity smaller than a first threshold value of 0.85 due to an effect of an environmental noise so that the judgment unit 58 is not capable of recognizing the speech. On the other hand, the word "cola" has a cumulative similarity greater than the cumulative similarity of the input speech "coffee", exceeding a candidate threshold value of 0.5 due to an effect of an environmental noise so that the cumulative similarity of the word "cola" is stored in the candidate buffer 66. In the end, however, the cumulative similarity of the input speech "coffee" exceeds the maximum value of the cumulative similarity of the word "cola" so that the cumulative similarity of the input speech "coffee" is stored in the candidate buffer 66. Thus, the control unit 68 recognizes the speech of the word "coffee" corresponding to the cumulative similarity stored in the candidate buffer 66.

According to the second embodiment described above, if the judgment unit 58 is not capable of recognizing the speech of an input word due to an effect of an environmental noise, the control unit 68 recognizes the speech of a word with a maximum similarity exceeding a fixed threshold value within a fixed period of time. As a result, the speech recognition rate in a state of an environmental noise can be increased.

Third Embodiment

Figure 10:
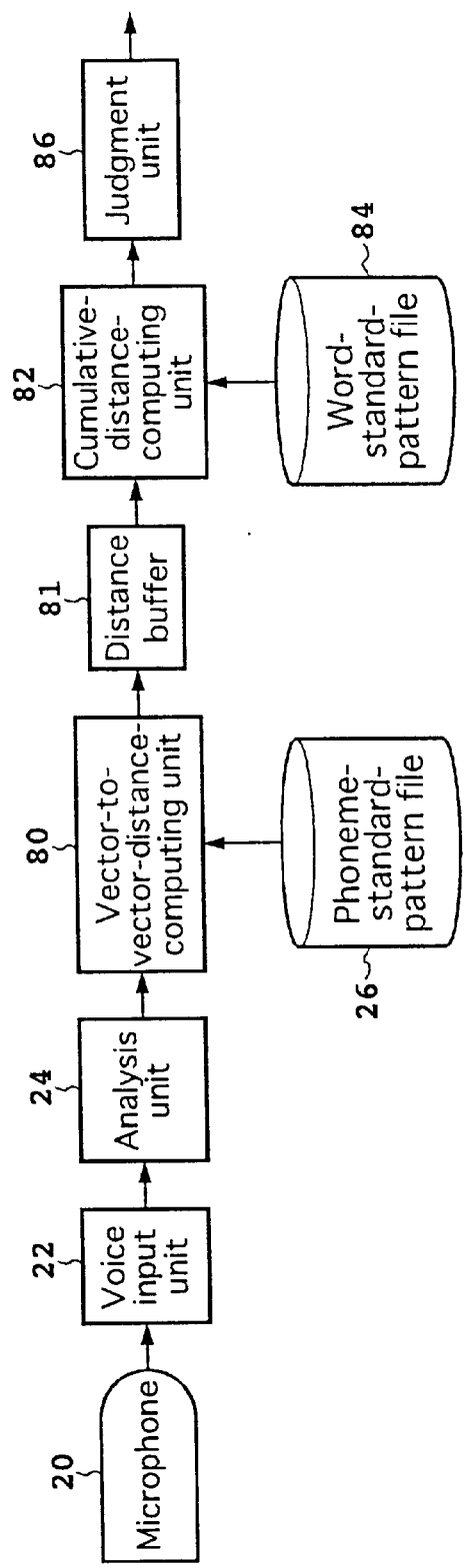
FIG. 10 is a diagram showing the configuration of a speech-recognizing apparatus implemented by a third embodiment of the present invention.

FIG. 10 is a diagram showing the configuration of a speech-recognizing apparatus implemented by a third embodiment of the present invention. Configuration elements of the third embodiment virtually identical with those of the first embodiment shown in FIG. 2 are each denoted by the same reference numeral as the counterpart in the latter. As shown in FIG. 10, the speech-recognizing apparatus comprises a microphone 20, a speech input unit 22, an analysis unit 24, a phoneme-standard-pattern file 26, a vector-to-vector-distance-computing unit 80, a distance buffer 81, a cumulative-distance-computing unit 82, a word-standard-pattern file 84 and a judgment unit 86.

The vector-to-vector-distance-computing unit 80 computes vector-to-vector distances from characteristic vectors of speech frames to phoneme standard patterns stored in the phoneme-standard-pattern file 26, and stores the vector-to-vector distances in the distance buffer 81. In this embodiment, vector-to-vector distances are computed. It should be noted that vector-to-vector similarities can also be computed instead.

Figure 11:
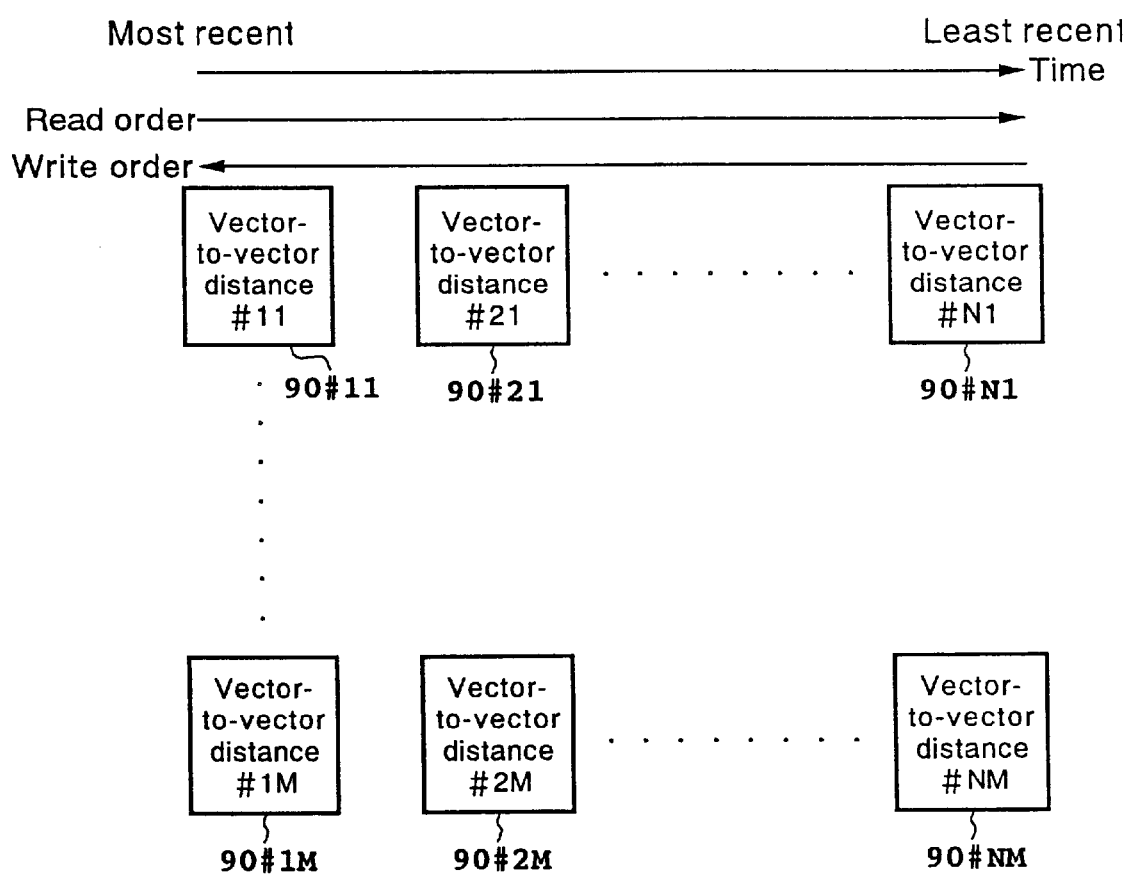
FIG. 11 is an explanatory diagram showing a distance buffer employed in the speech-recognizing apparatus shown in FIG. 10.

FIG. 11 is an explanatory diagram showing the distance buffer 81 employed in the speech-recognizing apparatus shown in FIG. 10. As shown in FIG. 11, storage areas are reserved for storing vector-to-vector distances arranged to form a matrix of N columns×M rows. M vector-to-vector distances on each column are computed for a speech frame. Since the matrix comprises N columns, the distance buffer 81 can be used for accommodating vector-to-vector distances for N speech frames. N is the maximum number of speech frames required for recognizing a word. On the other hand, N vector-to-vector distances on each row are computed for a phoneme standard pattern. Since the matrix comprises M rows, the distance buffer 81 can be used for accommodating vector-to-vector distances for M phoneme standard patterns. That is to say, the distance buffer 81 comprises storage areas 90#ij where i=1 to N and j=1 to M for storing N×M vector-to-vector distances. To put it in detail, the subscripts i=1 to N denote vector-to-vector distances computed one after another along the time axis. The larger the subscript i is, the least recent the vector-to-vector distance is. Vector-to-vector distances are stored into and read out from the distance buffer 81 in column units. Thus, in the distance buffer 81, the vector-to-vector distances in storage areas 90#ij where i=N, j=1 to M are stored least recently to be followed by the vector-to-vector distances in storage areas 90#ij where i=N−1, j=1 to M and the vector-to-vector distances in storage areas 90#ij where i=1, j=1 to M are stored most recently. However, vector-to-vector distances are read out from the distance buffer 81 on a LIFO (Last In First Out) basis. That is to say, the vector-to-vector distances in storage areas 90#ij where i=1, j=1 to M are read out first and the vector-to-vector distances in storage areas 90#ij where i=N, j=1 to M are read out last.

Figure 12:
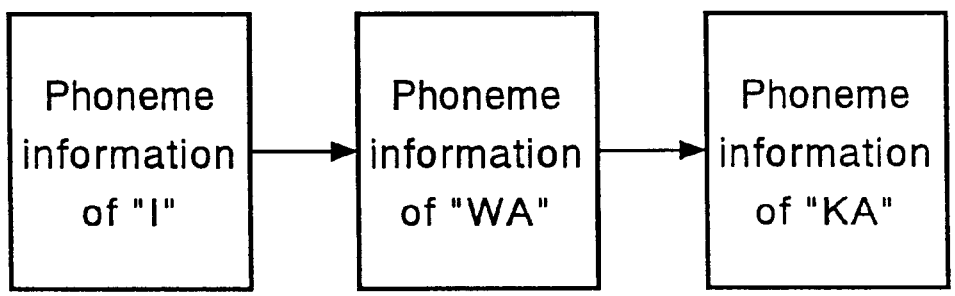
FIG. 12 is an explanatory diagram showing a word standard pattern used in the speech-recognizing apparatus shown in FIG. 10.

FIG. 12 is an explanatory diagram showing a word standard pattern stored in the word-standard-pattern file 84 in the speech-recognizing apparatus shown in FIG. 10. The word standard pattern is stored in the word-standard-pattern file 84 in an order opposite to the order in which pieces of phoneme information of the word standard pattern are generated. In the case of the word standard pattern "KAWAI", for example, the pieces of phoneme information "I", "WA" and "KA" are stored one piece after another in the word-standard-pattern file 84 in the order of enumeration, which is opposite to the order in which pieces of phoneme information of the word standard patterns are generated.

The cumulative-distance-computing unit 82 treats a speech interval as a frame period, that is, an interval including most speech frames beginning with a start speech frame matching the most recent speech frame. For each speech interval, vector-to-vector distances of phoneme standard patterns corresponding to side information of each word standard pattern cataloged in the word-standard-pattern file 84 are read out sequentially starting from the most recent frame. That is to say, vector-to-vector distances are read out in frame (column) units from the storage areas 90#ik where 1<=k (j)<=M of the distance buffer 81 whereas j=1, - - - and so on, sequentially one frame after another in a backward direction along the time axis shown in FIG. 11. Then, the cumulative-distance-computing unit 82 computes a cumulative sum of vector-to-vector distances read out from the distance buffer 81 by adoption of the DP matching technique or the HMM technique to produce a cumulative distance for all the word standard patterns in the speech interval. In the word-standard-pattern file 84, pieces of speech information are laid out in a direction opposite to an order in which the word standard patterns are generated. Thus, the cumulative-distance-computing unit 82 produces a correct cumulative distance even if the cumulative distance is computed by reading out the distance vectors from the distance buffer 81 in the backward direction starting with the most recent frame. The judgment unit 86 compares the cumulative distance computed by the cumulative-distance-computing unit 82 with a threshold value and, if the cumulative distance is found smaller than the threshold value, the word represented by the cumulative distance is determined to be a word matching the input speech.

Next, the operation of the speech-recognizing apparatus shown in FIG. 10 is explained. The microphone 20 converts the input speech into an electrical signal. The speech input unit 22 amplifies the electrical signal received from the microphone 20 and converts the amplified analog electrical signal into a digital signal. The analysis unit 24 carries out signal processing such as a cepstrum analysis on the input audio signal for each speech frame with a fixed typical time duration in the range 10 to 20 ms in order to produce a multi-dimensional characteristic vector having a predetermined number of dimensions such as 34 dimensions. The vector-to-vector-distance-computing unit 80 computes Euclid distances, that is, vector-to-vector distances between characteristic vectors of speech frames computed by the analysis unit 24 and phoneme standard patterns. The vector-to-vector distances for the most recent frame are then stored in the distance buffer 81. The cumulative-distance-computing unit 82 treats a speech interval as a frame period, that is, an interval including most possible speech frames beginning with a start speech frame matching the most recent speech frame. For each speech interval, vector-to-vector distances for phoneme standard patterns corresponding to phonemes defined for a word standard pattern cataloged in the word-standard-pattern file 84 are read out from the distance buffer 81 in speech-frame units sequentially one unit after another starting with the most recent speech frame. That is to say, the vector-to-vector distances are read out in column units from the matrix of storage areas 90#ik(j) where 1<=k (j)<=M in the distance buffer 81 whereas j=1, - - - and so on, one column after another in a backward direction along the time axis shown in FIG. 11. Then, the cumulative-distance-computing unit 82 computes a cumulative sum of vector-to-vector distances read out from the distance buffer 81 by adoption of the DP matching technique or the HMM technique to produce a cumulative distance for all the word standard patterns in the speech interval.

At that time, the most recent speech frame is taken as a start edge and the start edge is fixed as shown in FIG. 13. Since a cumulative distance is computed in the backward direction along the time axis by adopting an end-edge-free method, the amount of processing can be reduced in comparison with the ordinary word-spotting method shown in FIG. 14 wherein an interval of possible speech existence is treated as a speech interval. In addition, unlike the end-edge-free method shown in FIG. 15 wherein the speech interval is indefinite unless speech with most possible frames is input, no delay τ results. The judgment unit 86 compares the cumulative distance for the word standard pattern with a threshold value. If the cumulative distance for the word standard patterns is found smaller than the threshold value, the input speech is determined to be a speech corresponding to a word for the word standard pattern. As described above, in the case of the third embodiment, the amount of processing can be reduced in comparison with the word-spotting method. In addition, unlike the end-edge-free method, no delay τ results.

As described above, according to the present invention, by using a frame-to-frame distance in comparison of input speech with a standard pattern, the effect of a noise or the like can be reduced so that speech can be detected even in the case of a reduced frame-to-frame similarity or an increased frame-to-frame distance between input speech and a standard pattern due to the effect of a noise or the like. In addition, the amount of processing in the word-spotting method can be reduced while, at the same time, the delay τ of the end-edge-free method does not result.

What is claimed is:

1. A speech-recognizing apparatus for recognizing input speech, said apparatus comprising:

a phoneme-standard-characteristic-pattern storage unit for storing a phoneme characteristic vector of a plurality of phoneme standard patterns in advance;

an analysis unit for computing a characteristic vector for each of frames of said input speech;

a vector-to-vector-distance-computing unit for computing a vector-to-vector distance between said characteristic vector for each of said frames and said phoneme characteristic vector;

an average-value-computing unit for computing an average value of vector-to-vector distances of phonemes for one of said frames;

a correction unit for correcting said vector-to-vector distance by subtracting said average value from said vector-to-vector distance;

a word-standard-pattern storage unit for storing a word standard pattern defining a combination of said phoneme standard patterns by word models in advance; and a recognition unit for cumulating corrected vector-to-vector distances each produced by said correction unit into a cumulative vector-to-vector distance for speech inputted at different times, and comparing said cumulative vector-to-vector distance with said word standard pattern in order to recognize said input speech.

2. A speech-recognizing apparatus for recognizing input speech, said apparatus comprising:

an analysis unit for computing characteristic vectors of intervals in said input speech;

a word-standard-pattern storage unit for storing characteristic vectors of word standard patterns in advance;

a similarity-computing unit for comparing said characteristic vectors of said intervals in said input speech with said characteristic vector of said word standard patterns in order to compute a first similarity to each word standard pattern for a portion of said input speech in each of said intervals;

a first judgment unit for forming a judgment as to whether or not a word of a word standard pattern corresponding to said first similarity is a word represented by said input speech by comparison of said first similarity or a result of computation based on said first similarlity with a first threshold value;

a candidate storage unit for storing a second similarity;

a candidate-determining unit, which is used for storing said first similarity into said candidate storage unit if:

an outcome of a judgment formed by said first judgment unit indicates that said word of said word standard patterns corresponding to said first similarity is not said word represented by said input speech as evidenced by the fact that said first similarity is smaller than said first threshold value;

said first similarity is greater than said second similarity stored in said candidate storage unit respectively; and a second judgment unit, which is used for determining that said word of a word standard pattern corresponding to a value stored in said candidate storage unit is said word represented by said input speech on the basis of said second similarities or a result of computation based on said second similarity stored in said candidate storage unit in case an outcome of a judgment formed by said first judgment unit indicates that said word of said word standard patterns corresponding to said first similarities is not said word represented by said input speech within a predetermined period.

3. A speech-recognizing apparatus for recognizing an input speech, said apparatus comprising:

an analysis unit for computing characteristic vectors of intervals in said input speech;

a word-standard-pattern storage unit for storing a characteristic vector of word standard patterns in advance;

a distance-computing unit for comparing said characteristic vectors of said intervals in said input speech with said characteristic vector of said word standard patterns in order to compute a first distance to each word standard pattern for a portion of said input speech in each of said intervals;

a first judgment unit for forming a judgment as to whether or not a word of said word standard patterns corresponding to said first distance is a word represented by said input speech by comparison of said first distance or a result of computation based on said first distance with a first threshold value;

a candidate storage unit for storing a second distance;

a candidate-determining unit, which is used for storing said first distance as said second distance into said candidate storage unit if:

an outcome of a judgment formed by said first judgment unit indicates that said word of said word standard patterns corresponding to said first distance is not said word represented by said input speech as evidenced by the fact that said first distance is greater than said first threshold value;

said first distance is smaller than a second threshold value greater than said first threshold value; and said first distance is smaller than said second distance stored in said candidate storage unit; and a second judgment unit, which is used for determining that a word of said word standard pattern corresponding to said second distance stored in said candidate storage unit is said word represented by said input speech on the basis of said second distance stored in said candidate storage unit in case an outcome of a judgment formed by said first judgment unit indicates that said word of said word standard pattern corresponding to said first distance is not said word represented by said input speech within a predetermined period.

4. A speech-recognizing apparatus for recognizing an input speech, said apparatus comprising:

a phoneme-standard-pattern storage unit for storing a phoneme characteristic vector of a plurality of phoneme standard patterns in advance;

an analysis unit for computing a characteristic vector of each frame in said input speech;

a distance storage unit for storing vector-to-vector distances for each frame;

a vector-to-vector-distance-computing unit for computing a vector-to-vector distance between said characteristic vector of said frame and said phoneme characteristic vector of said phoneme standard patterns and storing said vector-to-vector distance into said distance storage unit;

a word-standard-pattern storage unit for storing a word standard pattern defining side information of said phoneme standard patterns for each word in advance;

a cumulative-distance-computing unit for reading out said vector-to-vector distances in a backward direction, that is, a direction from a most recent vector-to-vector distance to a less recent vector-to-vector distance, from said distance storage unit and computing a cumulative distance in said backward direction for all said words; and a judgment unit for forming a judgment as to whether or not a word corresponding to said cumulative distance computed by said cumulative-distance-computing unit is a word represented by said input speech on the basis of said cumulative distance.

5. A speech-recognizing apparatus for recognizing input speech, said apparatus comprising:

a phoneme-standard-pattern storage unit for storing a phoneme characteristic vector of a plurality of phoneme standard patterns in advance;

an analysis unit for computing a characteristic vector of each frame in said input speech;

a similarity storage unit for storing similarities to said phoneme standard patterns for each frame;

a similarity-computing unit for computing a similarity between said characteristic vector of said frame and said phoneme characteristic vector of said phoneme standard patterns and storing said similarity into said similarity storage unit;

a word-standard-pattern storage unit for storing a word standard pattern defining side information of said phoneme standard patterns for each word in advance;

a cumulative-similarity-computing unit for reading out similarities in a backward direction, that is, a direction from a most recent similarity to a less recent similarity, from said similarity storage unit and computing a cumulative similarity in said backward direction for said all words; and a judgment unit for forming a judgment as to whether or not a word corresponding to said cumulative similarity computed by said cumulative-similarity-computing unit is a word represented by said input speech on the basis of said cumulative similarity.

* * * * *